April 26, 1938.       R. JENNETT       2,115,265
ROTARY HEDGE CUTTER
Filed Jan. 24, 1936
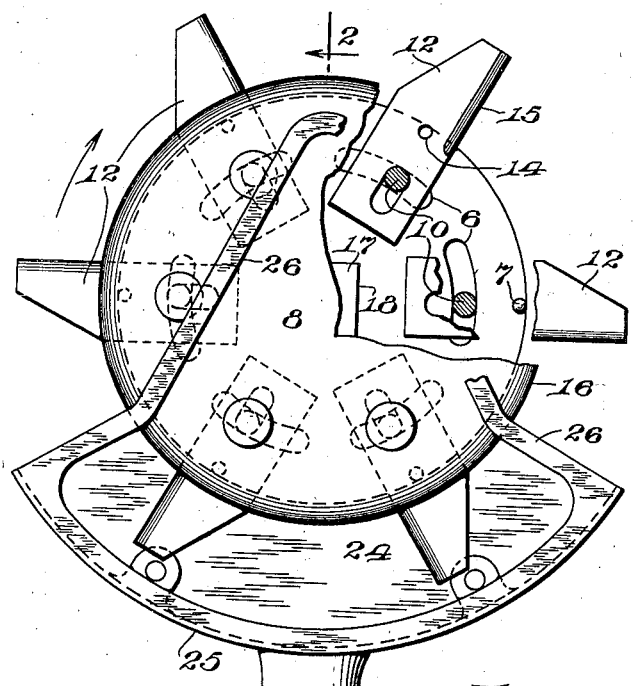
Fig. 1.
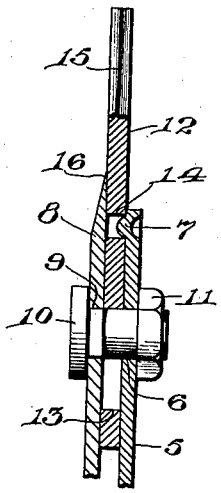
Fig. 3.
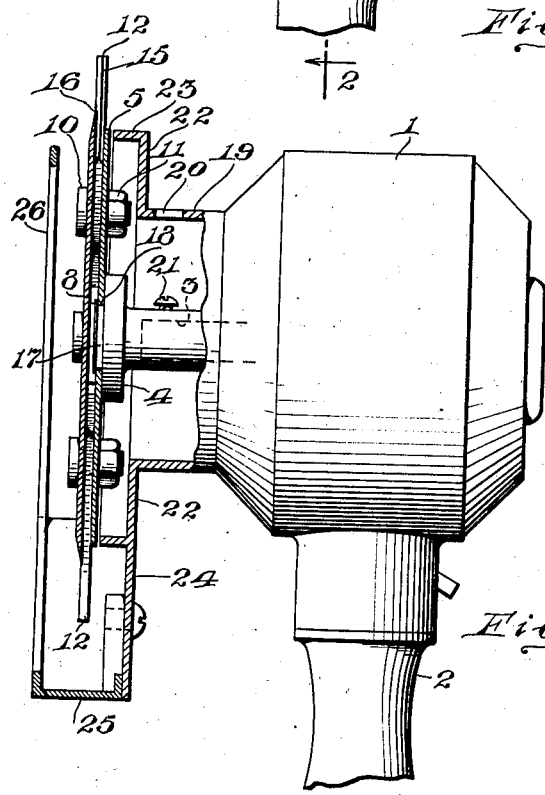
Fig. 2.
Fig. 4.
INVENTOR
Robert Jennett,
BY
ATTORNEY Patented Apr. 26, 1938

2,115,265

UNITED STATES PATENT OFFICE 2,115,265

ROTARY HEDGE CUTTER

Robert Jennett, Camden, N. J.

Application January 24, 1936, Serial No. 60,555

7 Claims. (Cl. 30—276)

The object of the invention is to provide improvements in rotary hedge cutters, and more particularly in that type which is driven or actuated by an electric motor, or other means, for producing rotation of the one or more knives with respect to a relatively stationary support, this application comprising a continuation in part of co-pending application Serial No. 743,325 filed September 10, 1934, which matured into Patent No. 2,028,784, issued January 28, 1936.

Another object is to provide in such a device the combination of a rotatable shaft, a head carried by said shaft, a plurality of knives pivotally carried by said head and rotatable in a common plane, said knives being angularly adjustable with respect to radii passing thru their respective pivots, means to adjust said knives simultaneously, and means to secure said knives in predetermined angular arrangement.

A further object is to provide in such a device the combination of a rotatable shaft, a disc-like member carried by said shaft and provided with a peripheral cutting edge, preferably adjacent to or in the plane of one of its lateral surfaces, and a plurality of knives carried by said member and in angularly adjustable relation with said cutting edge.

Still another object is to provide the combination of the structure of the last paragraph, with means to simultaneously adjust the angular relationship of said knives with respect to said cutting edge, and means to normally maintain said knives in predetermined fixed positions.

And a still further object is to provide, in combination with the various structures hereinbefore recited, a casing having a substantially cylindrical flange, which terminates in relatively close proximity to the plane of rotation of said head, and serves to prevent blades of grass, twigs of hedge, and such foreign matter, from entering said casing and fouling the driving shaft.

With these and other objects in mind, the invention comprises further details of construction and operation, which are hereinafter fully brought out in the following description, when read in conjunction with the accompanying drawing, in which Fig. 1 is a partially fragmentary front elevational view of a device comprising one embodiment of the invention;

Fig. 2 is a side elevational view of the driving motor with a fragmentary portion of the supporting handle of the same, and a sectional view of the cutting elements taken on the line 2—2 of Fig. 1;

Fig. 3 is an enlarged fragmentary sectional view showing a portion of the knife supporting member, a portion of the combined cutting element and adjusting and clamping means, and a knife operatively positioned therebetween; and Fig. 4 is a front elevation of the supporting head and the knives in adjusted acute angular relation therewith.

Referring to the drawing, there is shown an electric motor 1, which is representative of any suitable or available form of driving mechanism, the same being supported by means of a handle 2, or otherwise, as may be desired. The usual shaft 3 of the motor is provided with a preferably demountable head or arbor 4, to which is preferably fixedly secured a disc-like supporting member 5, provided with a series of circumferentially spaced arcuate slots 6, of substantially the same distance from the axis of said head, and also with spaced lugs 7 adjacent to the periphery of said supporting member 5, for a purpose hereinafter described.

A disc-like cutting element 8, of a diameter preferably somewhat greater than the supporting member 5, is provided with circumferentially spaced apertures 9, in which are positioned bolts 10, the opposite free end portions of which extend slidably thru the respective slots 6, and are provided with nuts or equivalent clamping means 11. The cutting element 8 is co-axial with the supporting member 5, and is separated therefrom by the radially inner end portions of intervening knives or the like 12, each such knife being provided with a longitudinally extending slot 13, and with an aperture 14 which normally receives one of the lugs 7, the slot 13 receiving the adjacent bolt 10, as shown particularly in Fig. 3. Each such knife is provided with a cutting edge 15, which is preferably positioned substantially mid-way between the planes of the laterally opposite surfaces of such knife, while the peripheral cutting edge 16 of the element 8 is preferably in the plane of that surface of said element, which is adjacent to and binds tightly against the knives 12.

If the knife-supporting member 5 does not comprise an integral part of the head 4, the latter is preferably provided with a polygonal extension 17, which extends thru a similarly shaped aperture 18 in the member 5, and is thereafter peened over, in order to prevent the accidental disengagement or relative loosening of said member with respect to said head. It will also be noted that the casing of the motor 1 in this device is extended to provide a cylindrical housing 19, having an aperture 20 thru which the screw 21 is accessible, by means of which screw the head 4 is detachably mounted upon the shaft 3, said casing thence merging into a planar section 22, in turn provided with a cylindrical extension 23, which terminates closely adjacent to the supporting member 5. The planar portion 22 of said casing is preferably extended at 24, to provide a support to which is detachably secured by any suitable means an arcuate shield 25, which may be of any form and size, but in the present instance is shown as comprising an outwardly positioned skeleton extension 26, which is of light weight and need only comprise the normally inverted V-shaped structure shown in Figs. 1 and 2, to form both a guard and a guide, spaced from but parallel with the rotary cutting unit 5—8—12. As a guard, this structure tends to minimize the danger of the knives 12 and adjacent annular cutting element 8 from coming into contact with any surface, upon which the device may be placed face downwardly while in operation, while as a guide such structure may be employed to aid in maintaining the progressive movement of the device in a predetermined course with respect to portions of a hedge or other body, while the same is being trimmed or cut by means of this improved device.

From the drawing, it is evident that the cutting edges 15 of the knives 12 may be positioned at any desired angle with respect to the adjacent annular cutting edge of the member 8, whether said knife edges are coincident with radii extending from the axis of rotation of the shaft 3 and the head 4, or whether said cutting edges extend angularly with respect of such radii, and at either acute or obtuse angles with respect to the adjacent cutting edge 16 of said annular element 8. In any case, the shifting of the angular relation of said knives with respect to said element 8 is accomplished by first loosening the nuts and bolts 10—11, turning the element 8 in either direction with respect to the supporting member 5, and thereafter tightening each of said bolts and nuts 10—11, after the proper position or angularity of the several knives has been attained.

It will be also apparent, that by bringing an annular flange of the motor casing into very close proximity with the plane of the knife-supporting member 5, the danger of blades of grass, twigs and the like entering said casing and fouling the shaft 3 and the head 4 is minimized. Furthermore, by positioning the cutting edge 15 of each knife substantially centrally between the planes of the laterally opposite surfaces of such knife, there is no tendency of each such knife to become twisted or warped during the act of cutting. On the other hand, it has been found practically essential to provide the cutting edge of the element 8 coincident with the plane of the inner surface of said element, or in other words closely adjacent to each of said knives, in order to minimize the possibility of blades of grass, twigs or the like becoming wedged between any one or more of said knives and the adjacent surface of said cutting element.

Having thus described my invention what I claim as new and desire to secure by Letters Patent is:—

1. A rotary cutter, comprising a rotatable driving member, a plurality of knives pivotally carried thereby and rotatable in a common plane, a disc-like cutting element normally positioned adjacent to said knives, and means to clamp said knives and said element in binding relation and cutting cooperation.

2. A rotary cutter, comprising a rotatable driving member, a plurality of knives pivotally carried thereby and rotatable in a common plane, a disc-like cutting element normally positioned adjacent to said knives, and means to clamp said knives and said element in binding relation and cutting cooperation, said knives being adjustable to variable acute angles with respect to the cutting edge of said element.

3. A rotary cutter, comprising a rotatable driving member, a plurality of knives pivotally carried thereby and rotatable in a common plane, a disc-like cutting element normally positioned adjacent to said knives, and means to clamp said knives and said element in binding relation and cutting cooperation, said knives being simultaneously adjustable angularly with respect to the cutting edge of said element.

4. A rotary cutter, comprising a rotatable driving member, a plurality of knives pivotally carried thereby and rotatable in a common plane, a disc-like cutting element normally positioned adjacent to said knives, means to clamp said knives and said element in binding relation and cutting cooperation, and means to simultaneously adjust said knives in said plane angularly with respect to the cutting edge of said element.

5. A rotary cutter, comprising a rotatable driving member, a plurality of knives pivotally carried thereby and rotatable in a common plane, a disc-like cutting element normally positioned adjacent to said knives, means to clamp said knives and said element in binding relation and cutting cooperation, means to simultaneously adjust said knives in said plane angularly with respect to the cutting edge of said element, and means to clamp said knives and said element normally in fixed unitary relation.

6. A rotary cutter, comprising a rotatable disc-like support, a plurality of knives pivotally carried by said support, a relatively stationary shield extending upon one side to within close proximity to and co-axial with said support, to prevent foreign matter from fouling said support, a disc-like cutting element having a cutting edge adjacent to each of said knives and also carried by said support, and means to normally clamp said element and said knives to said support, and maintain said knives in predetermined adjustable position.

7. A rotary cutter, comprising a rotatable support, a plurality of knives pivotally carried by said support, a relatively stationary shield extending to within close proximity to said support, to prevent foreign matter from fouling said support, a disc-like cutting element having a cutting edge adjacent to each of said knives and also carried by said support, means to normally clamp said element and said knives to said support, and maintain said knives in predetermined adjustable position, and means to simultaneously adjust said knives when said clamping means is loosened.

ROBERT JENNETT.